United States Patent
Sawyers-Abbott (10) Patent No.: US 9,976,484 B2
(45) Date of Patent: May 22, 2018

(54) CORE COMPARTMENT VENTILATION DEVICES FOR NACELLES OF GAS TURBINE ENGINES FOR COOLING A CORE COMPARTMENT OF A GAS TURBINE ENGINE

(71) Applicant: UNITED TECHNOLOGIES CORPORATION, Hartford, CT (US)

(72) Inventor: Nigel David Sawyers-Abbott, South Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 247 days.

(21) Appl. No.: 14/981,229

(22) Filed: Dec. 28, 2015

(65) Prior Publication Data

US 2017/0184025 A1    Jun. 29, 2017

(51) Int. Cl.
*F02C 7/12* (2006.01)
*F02K 3/06* (2006.01)
(Continued)

(52) U.S. Cl.
CPC ............. *F02C 7/12* (2013.01); *B64D 29/00* (2013.01); *F01D 25/145* (2013.01); *F02C 3/04* (2013.01); *F02C 7/25* (2013.01); *F02C 7/28* (2013.01); *F02K 3/06* (2013.01); *F05D 2220/323* (2013.01); *F05D 2240/15* (2013.01); *F05D 2240/91* (2013.01); *F05D 2260/605* (2013.01); *F05D 2260/608* (2013.01)

(58) Field of Classification Search
CPC ...... F02C 7/12; F02C 7/28; F02C 7/25; F02C 3/04; F01D 25/145; B64D 29/00; F02K 3/06; F05D 2260/605; F05D 2260/608; F05D 2240/91; F05D 2220/323; F05D 2240/15

See application file for complete search history.

(56) References Cited

U.S. PATENT DOCUMENTS 4,755,103 A  *  7/1988  Streifinger ............ F04D 29/063
                                                            184/6.11
5,251,435 A  *  10/1993  Pauley .................. B64D 29/00
                                                            244/54
(Continued)

FOREIGN PATENT DOCUMENTS

EP    0835805         4/1998
EP    0835805  A2 *   4/1998   ............. B64D 29/00
EP    0835805  A2 *   4/1998   ............. B64D 29/00

OTHER PUBLICATIONS

Extended European Search Report dated May 15, 2017 in European Application No. 16205550.3.

*Primary Examiner* — Valentina Xavier
(74) *Attorney, Agent, or Firm* — Snell & Wilmer, L.L.P.

(57) ABSTRACT

A core compartment ventilation device is provided. The core compartment ventilation device comprises a fireproof sealing member for substantially sealing a core compartment in a nacelle for a gas turbine engine and a chimney configured to be in fluid communication with the fireproof sealing member for conducting hot air from the core compartment to the external atmosphere via the fireproof sealing member. A gas turbine engine and nacelle including the core compartment ventilation device are also provided.

20 Claims, 6 Drawing Sheets

(51) Int. Cl.
*F02C 3/04* (2006.01)
*F02C 7/25* (2006.01)
*F02C 7/28* (2006.01)
*B64D 29/00* (2006.01)
*F01D 25/14* (2006.01)

(56) References Cited

U.S. PATENT DOCUMENTS

| | | | |
|---|---|---|---|
| 5,910,094 A * | 6/1999 | Kraft | B64D 29/00 |
| | | | 277/419 |
| 9,650,149 B2 * | 5/2017 | Wilcox | B64D 33/02 |
| 9,835,090 B2 * | 12/2017 | Exner | F02C 7/28 |
| 2009/0134276 A1 * | 5/2009 | Chaniot | B64C 1/10 |
| | | | 244/129.2 |
| 2017/0082022 A1 * | 3/2017 | Lee | F02K 3/062 |
| 2017/0254537 A1 * | 9/2017 | Cihlar | F23R 3/002 |
| 2017/0292450 A1 * | 10/2017 | Kutnjak | F02C 7/10 |

* cited by examiner

CORE COMPARTMENT VENTILATION DEVICES FOR NACELLES OF GAS TURBINE ENGINES FOR COOLING A CORE COMPARTMENT OF A GAS TURBINE ENGINE

FIELD

The present disclosure relates to gas turbine engines, and more specifically, to core compartment ventilation devices for nacelles of gas turbine engines for cooling a core compartment of the gas turbine engine.

BACKGROUND

Gas turbine engines conventionally include a nacelle surrounding an engine core within a core compartment. The core compartment includes the gas turbine engine power and accessory sections such as the compressor, combustor, and turbine sections of the gas turbine engine. The core compartment is classified as a "Designated Fire Zone" as it contains ignition sources and the potential for flammable fluid leakage. An elastomeric seal in the core compartment may be used as a fire barrier, but unfortunately also traps hot air in the core compartment with limited ventilation after engine shutdown.

The trapped hot air may negatively affect the nacelle and the gas turbine engine components, lessening their durability. Moreover, under some conditions, the temperature of the core compartment after engine shutdown could potentially exceed the auto ignition temperatures of the ignition sources that may be present in the core compartment. Thus, the core compartment needs better ventilation to vent the hot air outside of the core compartment and quickly reduce the core compartment temperature after shutdown, while remaining sealed for fire hazard mitigation.

SUMMARY

A core compartment ventilation device is provided, according to various embodiments. The core compartment ventilation device comprises a fireproof sealing member for substantially sealing a core compartment in a nacelle and a chimney configured to be in fluid communication with the fireproof sealing member for conducting hot air from the core compartment to the external atmosphere via the fireproof sealing member.

A gas turbine engine is provided, according to various embodiments. The gas turbine engine comprises a fan duct including a fan duct inner structure that surrounds a core engine and encloses a core compartment and extends between an upper bifurcation and a lower bifurcation, a fan case that surrounds a fan, and a core compartment ventilation device for sealing the core compartment against fire and for ventilating hot air from the core compartment to the external atmosphere. The core compartment ventilation device comprises a fireproof sealing member and a chimney configured to be in fluid communication with the fireproof sealing member for conducting the hot air from the core compartment to the external atmosphere via the fireproof sealing member.

A nacelle is provided for a gas turbine engine connected to an aircraft by a pylon structure, according to various embodiments. The nacelle comprises an upper bifurcation, a lower bifurcation, a fan duct inner structure extending between the upper and lower bifurcations, a core compartment enclosing an engine core of the gas turbine engine, and a core compartment ventilation device. Core compartment ventilation device is in fluid communication with the core compartment. Core compartment ventilation device comprises a fireproof sealing member and a chimney in fluid communication with the fireproof sealing member for conducting hot air therefrom.

In any of the foregoing embodiments, the hot air is discharged from the chimney in a direction opposite the pylon structure. The fireproof sealing member comprises a labyrinth seal. The fireproof sealing member is made from a fireproof material. The fireproof sealing member and the chimney comprising the core compartment ventilation device comprise a passive assembly for providing a fire barrier and ventilation. The core compartment ventilation device causes a chimney effect to draw cooling air into the core compartment through the lower bifurcation. The core compartment ventilation device is rotatable about a fan duct hinge line. At least one of the nacelle or the pylon structure includes at least a portion of the core compartment ventilation device disposed at least one of thereon or therein. The fireproof sealing member is configured to intake hot air from the core compartment and conducts the hot air into the chimney. The gas turbine engine is connected to an aircraft by a pylon structure and the nacelle comprises an upper bifurcation, a lower bifurcation, a fan duct inner structure extending between the upper and lower bifurcations, and the core compartment enclosing an engine core of the gas turbine engine. Discharge of the hot air from the chimney causes a chimney effect to draw cooling air into the core compartment through the lower bifurcation. The core compartment ventilation device operates after engine shutdown.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with the present inventions and the teachings herein. Thus, the detailed description herein is presented for purposes of illustration only and not of limitation. The scope of the present inventions is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Furthermore, any reference to singular includes plural embodiments, and any reference to more than one component or step may include a singular embodiment or step.

Various embodiments are directed to core compartment ventilation devices for nacelles of gas turbine engines for cooling a core compartment of the gas turbine engine. A "soakback ventilation temperature" is the temperature of the core compartment after engine shutdown, when the normal gas turbine engine ventilation systems are no longer operating. Various embodiments permit ventilation of the hot air from the core compartment of a nacelle in a gas turbine engine while maintaining the fire barrier integrity of the core compartment and bringing in cool ambient air to further cool the core compartment. Various embodiments also provide a passive system and passive assembly permitting such ventilation while maintaining the fire barrier integrity, without failure modes that could compromise the fire barrier, unlike active systems (e.g., mechanically opening doors or valves) with inherent failure modes.

As used herein, "aft" refers to the direction associated with the tail of the aircraft, or generally, to the direction of exhaust of the gas turbine engine. As used herein, "forward" or "front" refers to the direction associated with the nose of the aircraft, or generally, to the direction of flight.

Figure 1:
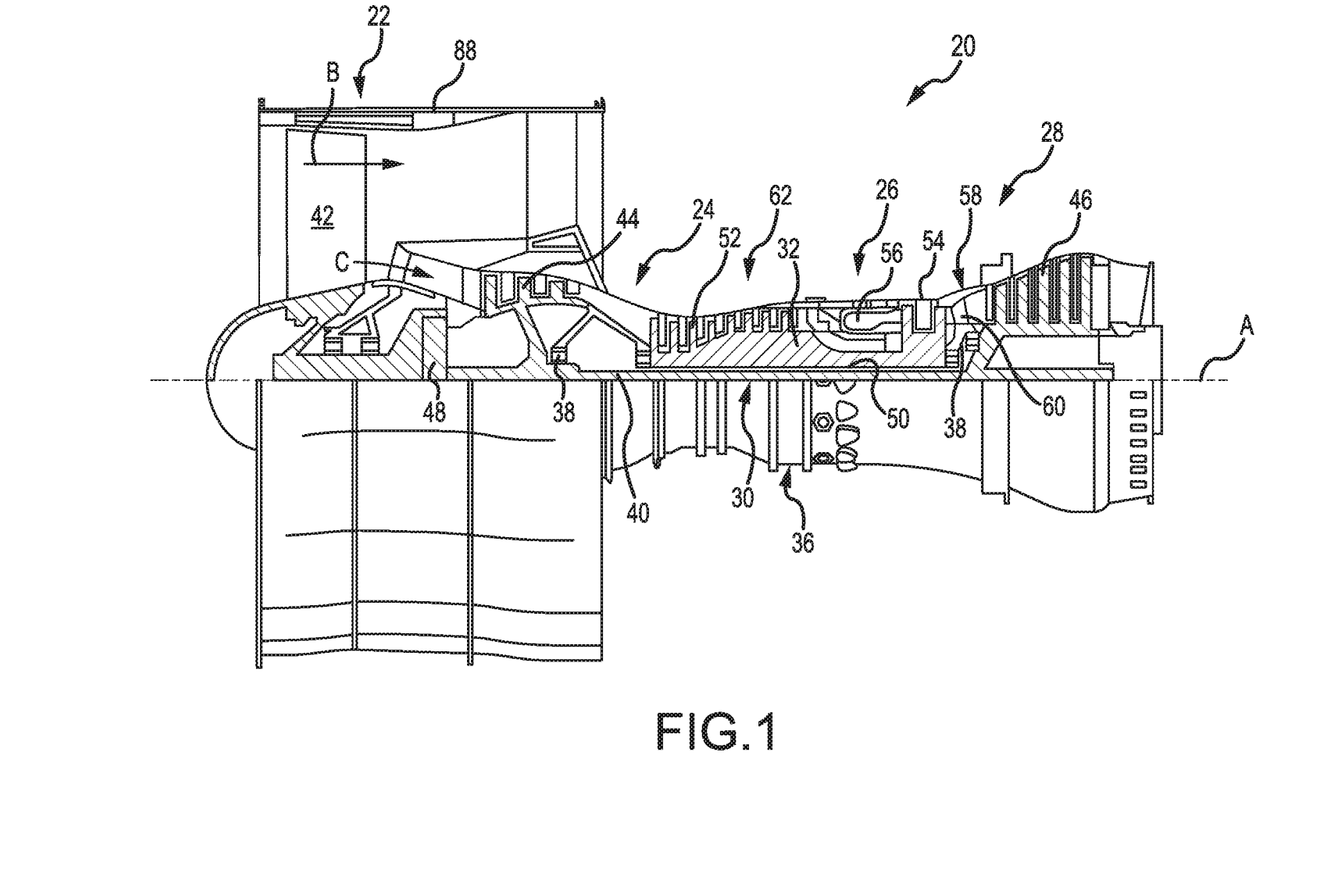
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22, the compressor section 24, and the combustor section 26 are collectively known as a core engine 62. Alternative engines might include an augmentor section (not shown) among other systems or features. The fan section 22 drives air along a bypass flow path B in a bypass duct defined within a fan case 88 inside a nacelle 34 (shown in FIG. 2), while the compressor section 24 drives air along a core flow path C for compression and communication into the combustor section 26 then expansion through the turbine section 28. Although depicted as a two-spool turbofan gas turbine engine 20 in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The high pressure turbine 54 and the low pressure turbine 46 rotationally drive the respective low speed spool 30 and high speed spool 32 in response to the expansion. It will be appreciated that each of the positions of the fan section 22, compressor section 24, combustor section 26, turbine section 28, and the geared architecture 48 may be varied. For example, geared architecture 48 may be located aft of combustor section 26 or even aft of turbine section 28, and fan section 22 may be positioned forward or aft of the location of geared architecture 48.

Figure 2:
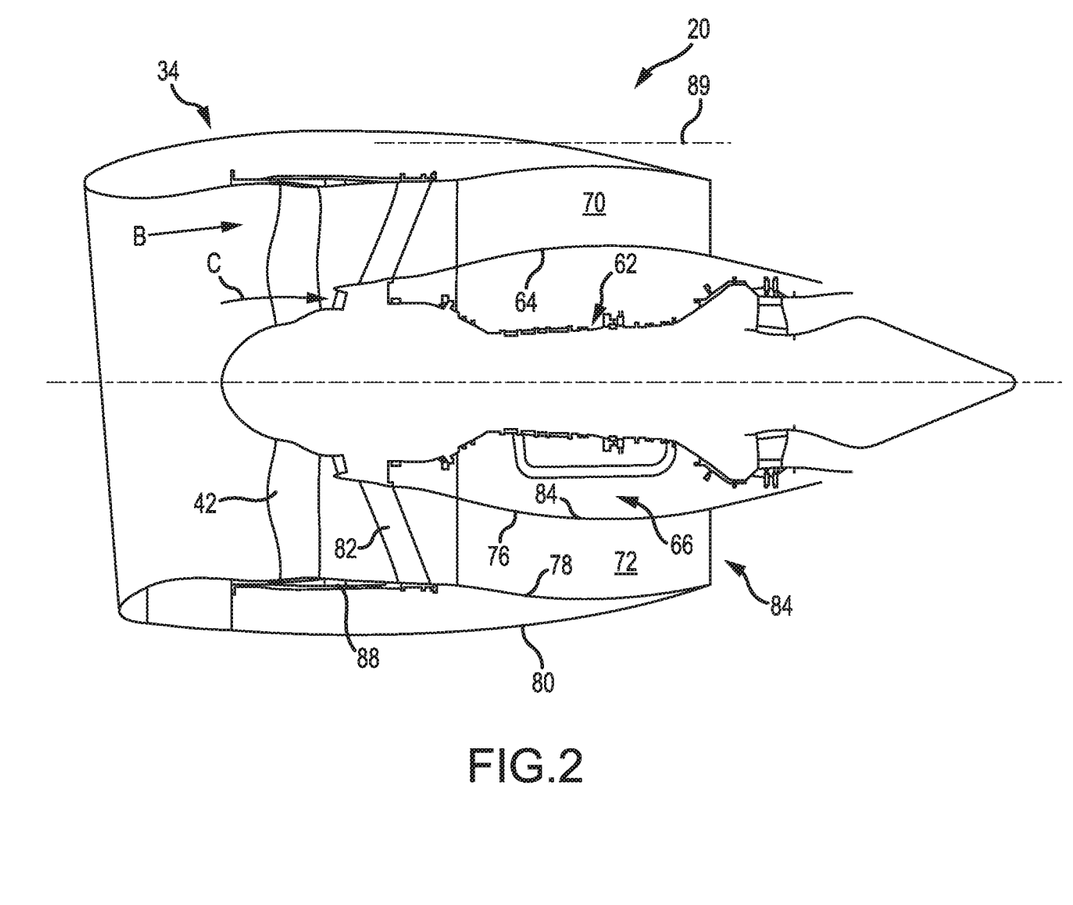
FIG. 2 is a schematic cross-section view of the gas turbine engine, illustrating a nacelle including a fan duct inner structure that surrounds an engine core and encloses a core compartment.

The gas turbine engine 20 in one example is a high-bypass geared aircraft engine. In a further example, the gas turbine engine bypass ratio is greater than about six (6:1), with an example embodiment being greater than about ten (10:1), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans. A significant amount of thrust is provided by a bypass flowpath B due to the high bypass ratio. Referring now to FIG. 2 and briefly to FIG. 5, a fan duct inner (fixed) structure 64 surrounds the core engine 62 The bypass flowpath B is provided by an inner flow surface 76 and an outer flow surface 78.

Figure 3:
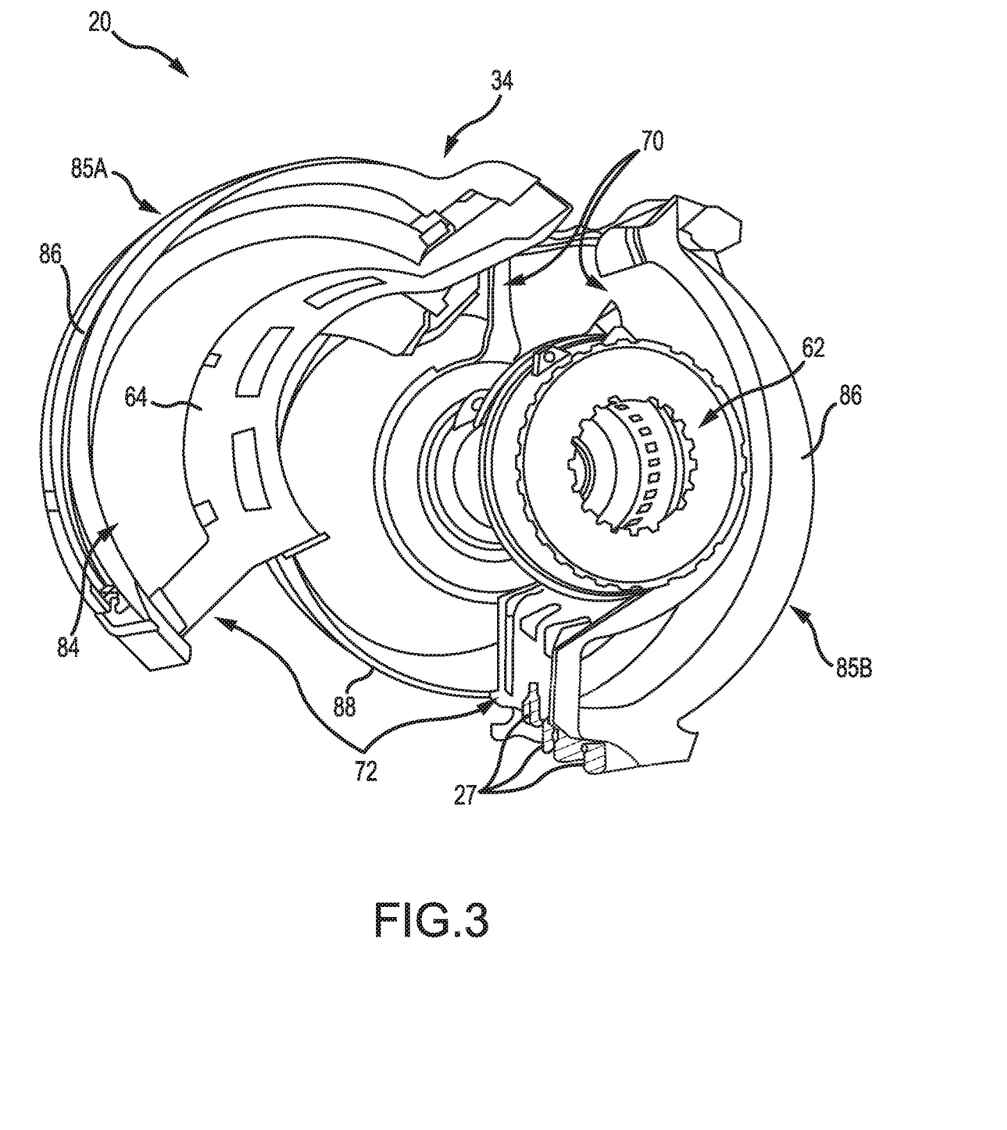
FIG. 3 is a perspective view of the nacelle with a door of the nacelle raised.

Referring now to FIG. 3, with continued reference to FIG. 2, the nacelle 34 encloses the fan case 88, core engine 62, fan duct inner (fixed structure) 64, upper and lower bifurcations 70 and 72, and a fan duct 84. A portion of the nacelle 34 that is aft of fan exit guide vanes 82 (shown in FIG. 2) includes the fan duct inner structure 64, the upper bifurcation 70, and the lower bifurcation 72, which together define the fan duct 84. In various nacelle 34 configurations, the upper bifurcation 70 and the lower bifurcation 72 may extend radially in the bypass flowpath B in locations opposite one another to accommodate wires, fluid conduits, engine mountings, or other components.

The fan duct 84 in the nacelle 34 may be provided with thermal protection as this defines the boundary of the core compartment (i.e., more particularly, the area between the engine case and the nacelle, bounded by the fan duct inner structure 64 and portions of the upper and lower bifurcations 70 and 72 may be a "Designated Fire Zone" (DFZ)). The thickness of the thermal protection is often determined by the temperature of the core compartment after engine shutdown (i.e., "soakback conditions"). As the core compartment conventionally overheats after engine shutdown as previously described, the thickness of the thermal protection may be greater than 0.5 inches thick to provide an extra layer of fire protection for the core compartment should there be any fire in the core compartment/Designated Fire Zone.

Nacelle 34 includes doors 85A and 85B, each with an outer diameter cowl 86. The nacelle 34 is split along the fan duct inner fixed structure 64, upper and lower bifurcations 70 and 72, and outer diameter cowl 86 into the doors 85A and 85B. The doors 85A and 85B (and the fan duct 84) open and close by pivoting on fan duct hinge lines 89 (FIG. 2). When open, the core compartment of the gas turbine engine is exposed for maintenance or engine removal and replacement. One or more latching mechanisms (e.g., 27 in FIG. 3) may secure the doors in a closed position. An elastomeric pylon seal 118 is compressed between the fan duct inner structure 64 and a seal land of a pylon structure 102 (FIG. 5) to provide sealing of the core compartment 66, a Designated Fire Zone. As noted previously, the seal may be used as a fire barrier, but unfortunately also traps hot air in the core compartment after engine shutdown.

The doors 85A and 85B are fastened or otherwise connected to a pylon structure 102 that connects the gas turbine engine 20 to an aircraft. The terms upper and lower refer to a plane of reference relative to the pylon structure and would equally apply in other engine mount configurations.

Figure 4:
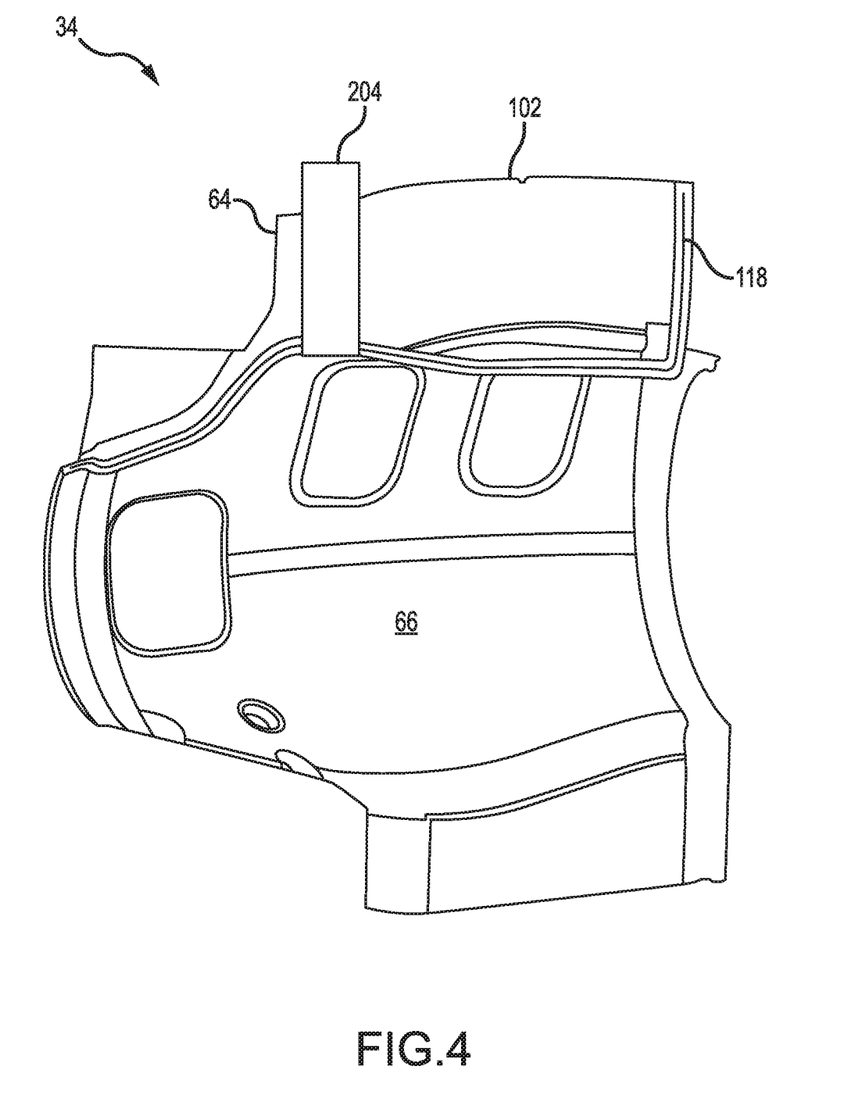
FIG. 4 is an isometric view of a portion of the core compartment of the nacelle of FIG. 2. illustrating schematically a ventilation system for cooling the core compartment according to various embodiments.
Figure 5:
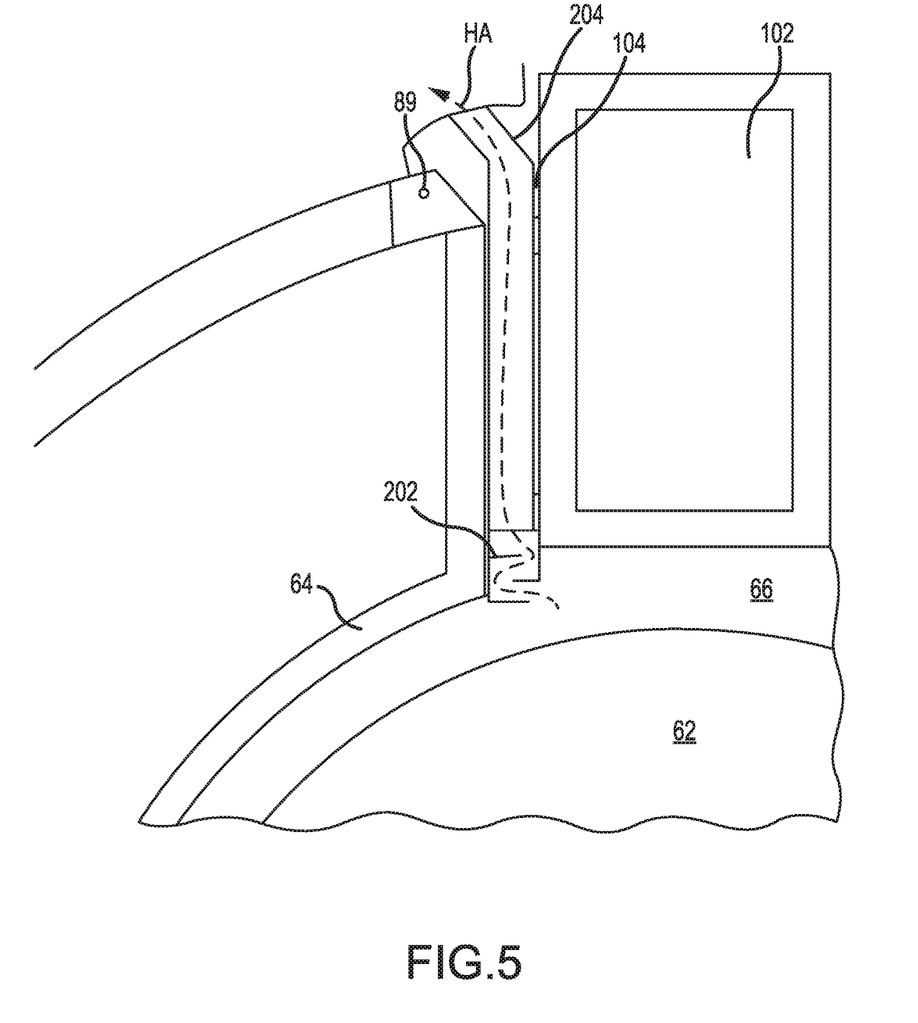
FIG. 5 is a schematic cross-sectional view of a portion of the fan duct inner structure of the nacelle surrounding a portion of the engine core and the core compartment from an aft position looking forward, illustrating a core compartment ventilation device disposed in a gap between adjacent surfaces of the fan duct inner structure and a pylon structure, according to various embodiments.

Referring now to FIGS. 4 and 5, according to various embodiments, a core compartment ventilation device 200 is depicted schematically as at least partially disposed in a gap 104 between adjacent external surfaces of the fan duct inner structure 64 and the pylon structure 102. The core compartment ventilation device 200 comprises a fireproof sealing member 202 in communication with a chimney 204. The fireproof sealing member 202 and the chimney 204 comprising the core compartment ventilation device comprise a passive assembly for providing a fire barrier and ventilation. The core compartment ventilation device 200 conducts hot air (indicated as arrow HA in FIGS. 4 and 5) away from the core compartment 66 and discharges the hot air into the external atmosphere. The fireproof sealing member 202 seals the core compartment 66. The fireproof sealing member 202, while providing a fire barrier, is not airtight and permits passage of the hot air therethrough, from the core compartment. According to various embodiments, the fireproof sealing member 202 may take the form of the labyrinth seal as shown schematically in FIG. 5 and should also be made of a fire resistant material. As shown in FIG. 4, the core compartment ventilation device permits vertical passage of hot air from the core compartment 66. While a labyrinth seal is depicted, it is to be understood that other fireproof seals made from fireproof materials may be used as long as the fireproof seal allows for passage of the hot air from the core compartment through the seal. For example, a "turkey feather" seal or other types of seals may be used. The core compartment ventilation device serves a dual function as a fire barrier and to permit the passage of hot air from the core compartment to the chimney and thereafter, for discharge out into the external atmosphere (i.e., the atmosphere external to the nacelle). The fireproof sealing member and the chimney may be one-piece or multiple pieces coupled together. The core compartment ventilation device is rotatable about the fan duct hinge line 89.

The chimney 204 comprises an elongated channel/chimney flue that conducts the hot air received from the fireproof sealing member to the external atmosphere. The chimney 204 comprises an inner portion that is adjacent an exit of the fireproof sealing member and an outer portion that extends exteriorly of the nacelle to be able to discharge the hot air into the atmosphere. The outer portion may be angled in a manner to discharge the hot air in the opposite direction of the pylon structure 102 as illustrated in FIG. 4. The hot air discharged through the fireproof sealing member and the chimney generates an upward air current by the chimney effect, drawing cool air in through the lower bifurcation 72 to additionally cool the core compartment after engine shutdown.

Figure 6:
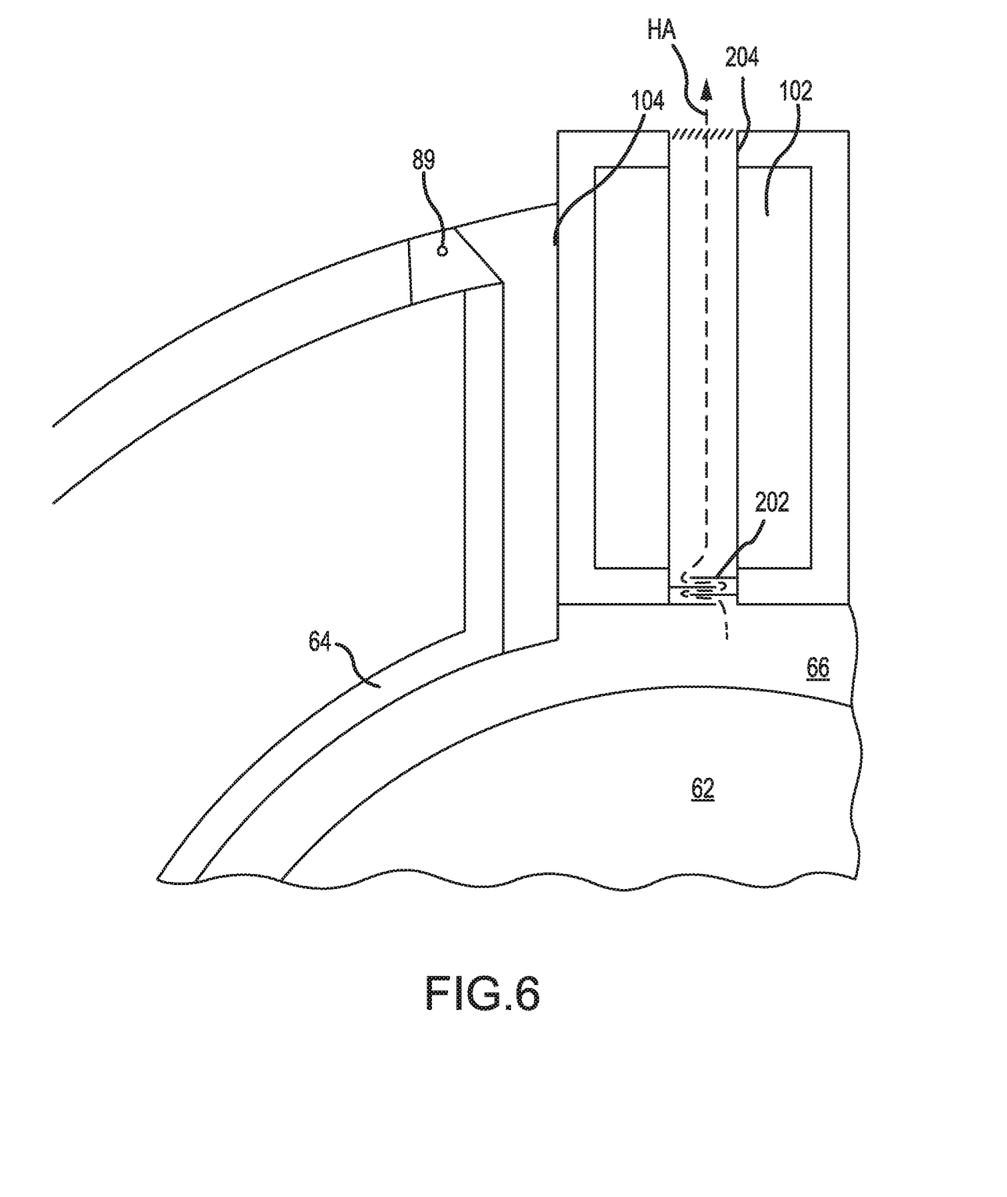
FIG. 6 is another schematic cross-sectional view illustrating the core compartment ventilation device disposed in a different location, according to various embodiments.

While the core compartment ventilation device has been described as at least partially disposed between adjacent surfaces of the pylon structure and the fan duct inner structure of the nacelle, it is to be understood that the core compartment ventilation device may be disposed in other locations to provide fluid communication from the core compartment to the external atmosphere and provide the chimney effect. For example, the core compartment ventilation device may be disposed primarily on the pylon structure 102 or through the pylon structure 102 as shown in FIG. 6.

Various embodiments thus permit hot air from the core compartment to be discharged into the atmosphere thereby cooling the core compartment after engine shutdown while, at the same time, preserving the fire barrier integrity of the core compartment. The core compartment ventilation device according to various embodiments serves the dual function of removing the hot air from the core compartment while, at the same time, bringing cool air into the core compartment through the lower bifurcation via the chimney effect. The core compartment ventilation device also enables the thermal protection conventionally used on the fan duct inner structure 64 to be more lightweight, because of the lower temperatures of the core compartment that are provided by various embodiments. As a result, use of various embodiments may result in a reduced nacelle weight. Various embodiments also provide a passive system and assembly without failure modes that could compromise the fire barrier.

Benefits, other advantages, and solutions to problems have been described herein with regard to specific embodiments. Furthermore, the connecting lines shown in the various figures contained herein are intended to represent exemplary functional relationships and/or physical mountings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the Figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A core compartment ventilation device comprising:
   a fireproof sealing member for substantially sealing a core compartment in a nacelle for a gas turbine engine; and
   a chimney in fluid communication with the fireproof sealing member and extending radially outward from the fireproof sealing member to discharge hot air from the core compartment to an atmosphere external to the nacelle.

2. The core compartment ventilation device of claim 1, wherein the fireproof sealing member is configured to intake hot air from the core compartment and conducts the hot air into the chimney.

3. The core compartment ventilation device of claim 2, wherein the fireproof sealing member is configured as a labyrinth seal.

4. The core compartment ventilation device of claim 1, wherein the fireproof sealing member and the chimney comprising the core compartment ventilation device comprise a passive assembly for providing a fire barrier and ventilation.

5. The core compartment ventilation device of claim 1, wherein the gas turbine engine is connected to a pylon structure and the nacelle comprises:
   an upper bifurcation;
   a lower bifurcation; and
   a fan duct inner structure extending between the upper bifurcation and the lower bifurcation, wherein the upper bifurcation, the lower bifurcation, and the fan duct inner structure at least partially enclose an engine core of the gas turbine engine.

6. The core compartment ventilation device of claim 5, wherein at least one of the nacelle or the pylon structure includes at least a portion of the core compartment ventilation device disposed at least one of thereon or therein.

7. The core compartment ventilation device of claim 6, wherein the chimney is configured to discharge the hot air in a direction opposite the pylon structure.

8. The core compartment ventilation device of claim 7, wherein discharge of the hot air from the chimney causes a chimney effect to draw cooling air into the core compartment through the lower bifurcation.

9. A gas turbine engine comprising:
   a fan duct including a fan duct inner structure that surrounds a core engine and encloses a core compartment;
   a pylon structure coupled to the core engine; and
   a core compartment ventilation device for sealing the core compartment against fire and for ventilating hot air from the core compartment to an external atmosphere, the core compartment ventilation device comprising:
      a fireproof sealing member; and
      a chimney in fluid communication with the fireproof sealing member, wherein the chimney extends radially outward from the fireproof sealing member and is located between the fan duct inner structure and the pylon structure.

10. The gas turbine engine of claim 9, wherein the hot air is discharged from the chimney in a direction opposite the pylon structure.

11. The gas turbine engine of claim 9, wherein the fireproof sealing member comprises a labyrinth seal made from a fireproof material.

12. The gas turbine engine of claim 9, wherein the core compartment ventilation device causes a chimney effect to draw cooling air into the core compartment.

13. The gas turbine engine of claim 9, wherein the core compartment ventilation device is rotatable about a fan duct hinge line.

14. The gas turbine engine of claim 9, further comprising a pylon seal compressed between the fan duct inner structure and the pylon structure.

15. A nacelle for a gas turbine engine connected to a pylon structure, the nacelle comprising:
   an upper bifurcation;
   a lower bifurcation;
   a fan duct inner structure extending between the upper bifurcation and the lower bifurcation, wherein the upper bifurcation, the lower bifurcation, and the fan duct inner structure define, at least partially, a core compartment located between an engine core of the gas turbine engine and the upper bifurcation, the lower bifurcation, and the fan duct inner structure; and a core compartment ventilation device in fluid communication with the core compartment, the core compartment ventilation device comprising:
  a fireproof sealing member; and
  a chimney in fluid communication with the fireproof sealing member and extending radially outward from the fireproof sealing member.

16. The nacelle of claim 15, wherein hot air is discharged from the chimney in a direction opposite the pylon structure.

17. The nacelle of claim 15 wherein the fireproof sealing member comprises a labyrinth seal.

18. The nacelle of claim 15, wherein the core compartment ventilation device comprises a passive assembly for providing a fire barrier and ventilation.

19. The nacelle of claim 15, wherein the core compartment ventilation device causes a chimney effect to draw cooling air into the core compartment through the lower bifurcation.

20. The nacelle of claim 15, wherein the core compartment ventilation device is rotatable about a fan duct hinge line.

* * * * *